United States Patent

Wadia et al.

[11] Patent Number: 5,725,354
[45] Date of Patent: Mar. 10, 1998

[54] FORWARD SWEPT FAN BLADE

[75] Inventors: Aspi R. Wadia, Loveland; Ian F. Prentice, Cincinnati; David W. Crall, Loveland; Carl C. Koch, Cincinnati, all of Ohio

[73] Assignee: General Electric Company, Cincinnati, Ohio

[21] Appl. No.: 754,345

[22] Filed: Nov. 22, 1996

[51] Int. Cl.$^6$ ............................................. F04D 29/38
[52] U.S. Cl. ................................................. 416/224
[58] Field of Search ............................. 416/224, 223 A

[56] References Cited

U.S. PATENT DOCUMENTS

| | | | |
|---|---|---|---|
| 1,250,681 | 12/1917 | Sheldon | 416/224 |
| 3,660,882 | 5/1972 | Widowitz et al. | 416/224 |
| 4,326,833 | 4/1982 | Zelahy et al. | 416/224 |
| 4,342,542 | 8/1982 | Tan et al. | 416/224 |
| 4,944,655 | 7/1990 | Merz | 416/224 |
| 5,167,489 | 12/1992 | Wadia et al. | 415/182.1 |
| 5,480,284 | 1/1996 | Wadia et al. | 416/91 |

*Primary Examiner*—John T. Kwon
*Attorney, Agent, or Firm*—Andrew C. Hess; Patrick R. Scanlon

[57] ABSTRACT

A gas turbine engine fan blade includes a main body having a radially spaced apart root and tip, and axially spaced apart leading and trailing edges. A front shell is fixedly joined to a portion of the body leading edge to collectively define with the body an airfoil having first and second opposite sides extending between the root, tip, shell, and trailing edge for pressurizing air flowing thereover. The shell is hollow to offset toward the trailing edge a collective center of gravity of the airfoil to reduce steady stress at the airfoil leading edge.

14 Claims, 2 Drawing Sheets

5,725,354

FORWARD SWEPT FAN BLADE

The U.S. Government has rights in this invention in accordance with Contract No. N000140-90-C-1546 awarded by the Department of the Navy.

BACKGROUND OF THE INVENTION

The present invention relates generally to gas turbine engines, and, more specifically, to fan blades therein.

A gas turbine engine includes two types of rotor blades, i.e. fan or compressor blades, and turbine blades. The former blades are rotated for pressurizing air, whereas the latter extract energy from hot combustion gases for powering the fan or compressor. Accordingly, the airfoils of these blades are differently configured aerodynamically for these specialized functions.

A fan blade is a specialized form of a compressor blade which is relatively larger for initially pressurizing air, a significant portion of which is used for providing propulsion thrust for powering an aircraft in flight. A portion of the fan air travels axially downstream in the engine typically through a multi-stage axial compressor wherein decreasingly smaller compressor blades further compress the air in turn to provide compressed air to a combustor wherein it is mixed with fuel and ignited for generating combustion gases which flow downstream to one or more turbine stages which extract energy therefrom.

Individual fan blades are suitably mounted around the circumference of a rotor disk as either discrete components, or integrally therewith in the form of a one-piece blisk. During operation, the blades and disk rotate and therefore generate substantial centrifugal forces which are carried by the disk. As the disk rotates during normal operation of the engine, the predominantly radial centrifugal forces are developed in the blades which causes a steady tensile stress therein. In addition to steady stress, the blades are also subject to alternating stress typically caused by vibration of the blade due to the airflow thereover. Neither of these stresses are uniform, but vary over the length, width, and thickness of the blade.

A natural characteristic of typical metals used for fan blades is that there is a steady stress design limit when no alternating stress is present, and an alternating stress design limit when no steady stress is present. When both stresses are present, there is an interaction such that the design limit for one decreases as the magnitude of the other increases. This stress design limit is graphically depicted in a conventional Goodman Diagram. Since stress varies significantly over the typical fan blade, the blade must be accurately configured for reducing alternating stress in regions of high steady stress, and vice versa.

An additional factor used in blade design is the effect of typical damage to areas of the blade due to ingestion of small objects such as grit from runways, small birds, ice, etc., during normal operation. Ingested objects may cause chips or nicks in the fan blades, most commonly in the leading edge thereof. This type of blade damage causes a stress concentration which may increase the magnitude of both steady and alternating stress up to a factor of about three. Since alternating stress at blade leading edges is typically relatively high, and since the leading edge is subject to foreign object caused stress concentration, successful blade design requires relatively low steady stress in the region of the leading edge.

The airfoil of a typical fan blade varies in configuration from its root to tip, and from leading to trailing edges thereof. However, the centers of gravity of each of the radial sections along the span of an airfoil are typically radially aligned with each other along a common radial stacking axis perpendicular to the axial or longitudinal centerline axis of the engine. In this way, the centrifugally generated force which acts at the centers of gravity is radially aligned with the center of the airfoil root resulting in a generally even distribution of steady stress from the leading to trailing edges.

The steady stress local to the leading edge of the airfoil may then be conventionally lowered by providing an undercut in the blade below the leading edge of the airfoil, or by axially or tangentially offsetting the airfoil above the blade shank for example. This reduces the steady stress along the leading edge of the airfoil during operation to ensure an effective useful life of the airfoil when it is subject to significant alternating stress, and stress concentration due to foreign object ingestion.

The stacking axis of a typical fan blade is usually linear and aligned with a radial axis of the engine extending perpendicularly outwardly from the engine centerline axis. In this way, blade stress may be limited during operation for providing an effective useful life of the blade. The aerodynamic configuration of the blade airfoil is suitably varied from root to tip to provide effective aerodynamic operation in pressurizing the air flowing over the airfoil during operation.

A new development in improved aerodynamic performance of fan blades is referred to as aerodynamic forward sweep which is disclosed in U.S. Pat. No. 5,167,489—Wadia et al. A forward swept fan blade has airfoil outboard portions which extend axially forwardly as it extends radially outwardly from the root to tip of the airfoil for providing advantages in efficiency and aerodynamic operation over conventional fan blades which extend radially outwardly without forward extension. The mechanical effect of incorporating forward sweep in an airfoil is to move the center of gravity of each forward swept radial section axially forwardly relative to the center of the root section of the airfoil causing a non-radial stacking axis of the airfoil. This substantially complicates the stress design of the airfoil by introducing an uneven distribution of steady stress which is higher toward the airfoil leading edge than toward the trailing edge. The ability to conventionally reduce the resultant increased steady stress at the airfoil leading edge is limited and is typically not sufficient to offset the full increase due to the amount of forward sweep desired in the airfoil.

The undesirable increase in leading edge steady stress in a fan blade incorporating forward sweep will occur in an airfoil of either conventional solid or hollow construction which are typically uniform from leading to trailing edges. Each airfoil radial section is typically uniform for uniformly developing centrifugal load over operation and for thereby uniformly distributing the corresponding steady stress therefrom. In solid and hollow airfoil construction, the stacking axis is typically linear, with the individual centers of gravity of each radial section being radially aligned with each other. The effect of forward sweep offsets the stacking axis toward the airfoil leading edge and undesirably increases the steady stress therein.

Accordingly, it is desirable to provide an improved airfoil configuration for forward swept fan or compressor blades for reducing steady stress along the leading edge region of the airfoil which would otherwise occur from effecting forward sweep.

SUMMARY OF THE INVENTION

A gas turbine engine fan blade includes a main body having a radially spaced apart root and tip, and axially spaced apart leading and trailing edges. A front shell is fixedly joined to a portion of the body leading edge to collectively define with the body an airfoil having first and second opposite sides extending between the root, tip, shell, and trailing edge for pressurizing air flowing thereover. The shell is hollow to offset toward the trailing edge a collective center of gravity of the airfoil to reduce steady stress at the airfoil leading edge.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
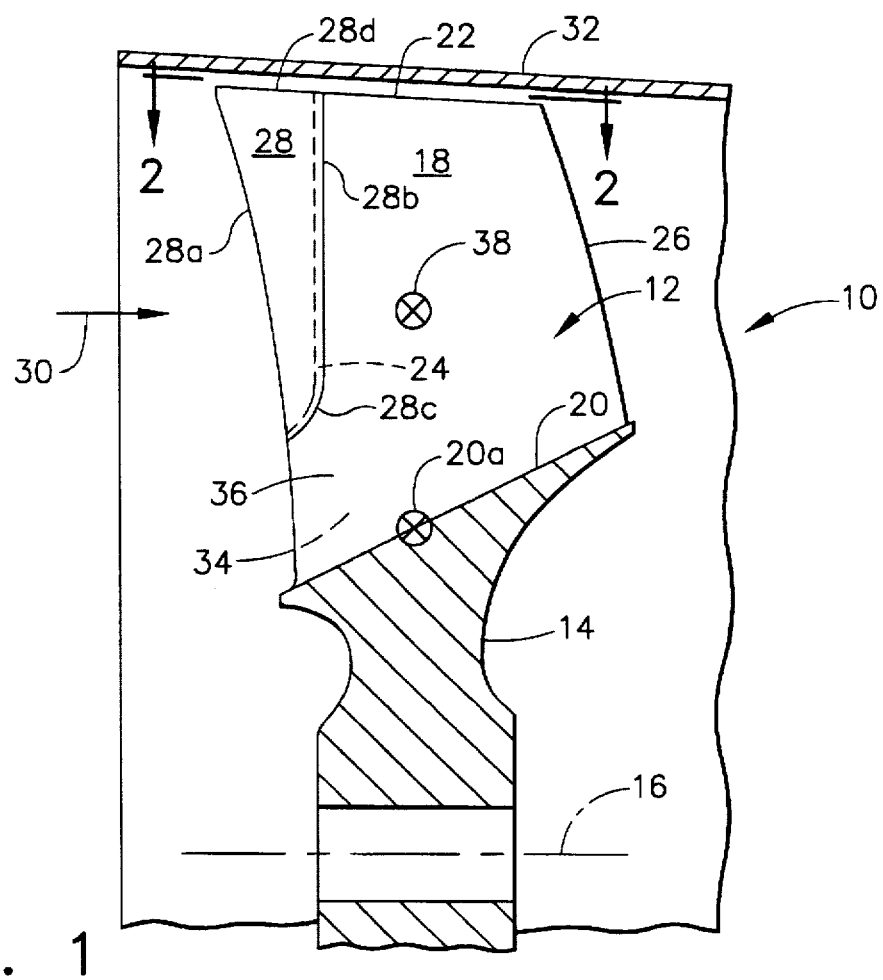
FIG. 1 is a partly sectional, meridional view of a portion of an exemplary aircraft turbofan gas turbine engine fan having a plurality of circumferentially spaced apart fan blades extending radially outwardly from a disk in accordance with one embodiment of the present invention.

Illustrated in FIG. 1 is an exemplary single stage fan, or compressor, 10 of an aircraft turbofan gas turbine engine in accordance with one embodiment of the present invention. The fan 10 includes a plurality of fan rotor blades 12 spaced circumferentially around an annular rotor disk 14 and coaxially about a longitudinal or axial centerline axis 16 of the engine. Each blade 12 may be suitably joined to the disk 14 in any conventional configuration by using, for example, conventional dovetails (not shown), or by being integrally formed therewith in a one-piece assembly conventionally known as a blisk as shown in FIG. 1.

In accordance with the present invention, each blade 12 includes a main body 18 having a radially inner root 20, and a radially outer tip 22 spaced radially outwardly therefrom. The main body 18 also includes a radially extending, forward leading edge 24, and a radially extending aft trailing edge 26 spaced axially aft of the leading edge 24. Both the body leading and trailing edges 24, 26 extend the entire radial span of the blade 12 from the root 20 to the tip 22.

A discrete front or leading edge shell 28 is fixedly joined to the body leading edge 24 at least at a tip or outboard portion thereof to collectively define with the body 18 a common two-piece airfoil, which in the exemplary embodiment is also designated by the numeral 12. In the exemplary embodiment illustrated in FIG. 1, each of the blades 12 is integrally joined at its root 20 to the disk 14 in a one-piece blisk arrangement, with the blade 12 forming the airfoil over which air 30 flows during operation. The perimeter of the disk 14 at the blade root 20 defines the inner flowpath boundary for the air 30, and a conventional annular casing 32 is spaced radially above the blade tips 22 to define the radially outer flowpath boundary for the air 30. In an alternate embodiment, each blade 12 may have an integral dovetail (not shown) removably mounted in corresponding slots in the perimeter of the rotor disk 14 if desired.

The airfoil, or blade, 12 defined by the two-piece main body 18 and front shell 28 is suitably aerodynamically configured for pressurizing the air 30 flowing axially thereover. The shell 28 has a leading edge 28a, and an aft end 28b which extends radially from a radially inner end 28c to a radially outer end 28d which forms a portion of the blade tip 22.

Figure 2:
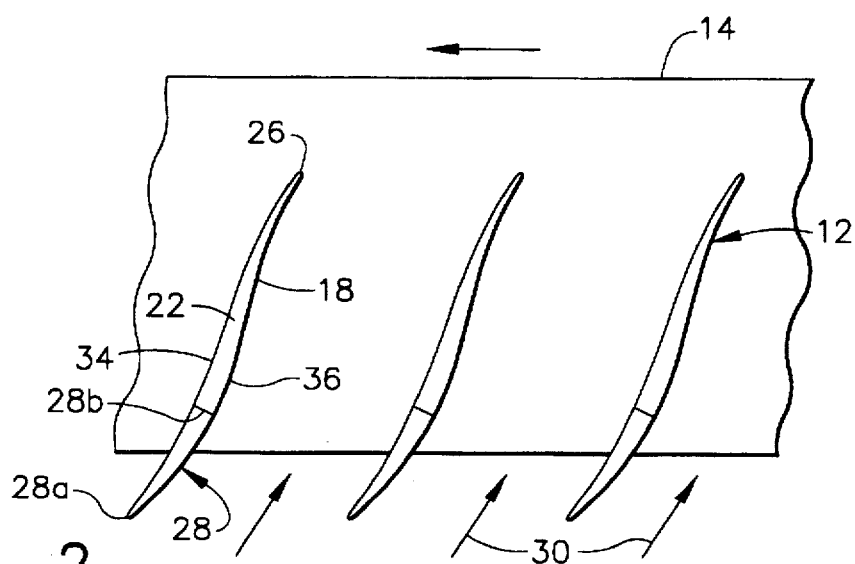
FIG. 2 is a top view of several of the fan blades illustrated in FIG. 1 and taken generally along line 2—2.

The shell 28 is suitably joined to the body 18 to provide an aerodynamically smooth outer surface which includes a first side 34 and a circumferentially opposite second side 36. The two sides are more fully illustrated in FIG. 2, with the first side 34 defining a pressure surface in the forward rotary direction of the disk 14, and the second side 36 defining a suction surface facing circumferentially opposite to the direction of rotation of the disk 14. Both sides 34, 36 extend radially from the root 20 to the tip 22 of the blade, and axially from the leading edge 28a of the shell 28 to the trailing edge 26 of the blade body 18 for pressurizing the air 30 flowing thereover during operation.

Figure 3:
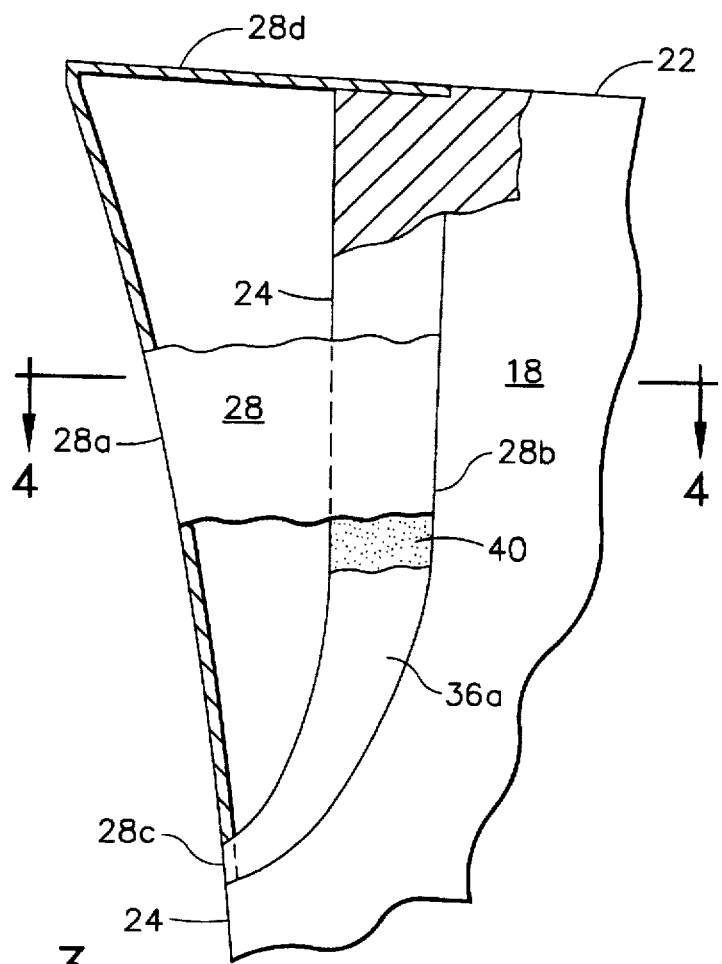
FIG. 3 is an elevational, partly sectional view of the leading portion of one of the fan blades illustrated in FIG. 1 showing a front shell attached to a main body of the airfoil in accordance with an exemplary embodiment of the present invention.
Figure 4:
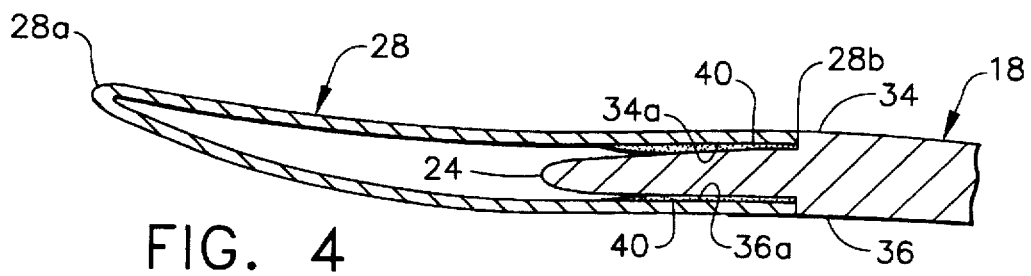
FIG. 4 is a radial sectional view of a mid-span portion of the airfoil illustrated in FIG. 3 and taken generally along line 4—4.

The shell 28 is illustrated in more particularity in FIGS. 3 and 4 and is preferably a thin walled hollow member to offset toward the blade trailing edge 26 the collective center of gravity 38 of the airfoil or blade 12 illustrated in FIG. 1. In the exemplary embodiment illustrated in the Figures, the main body 18 is solid, and is either metal or a suitable composite material, with the shell 28 forming a leading edge extension which is hollow for reducing the weight thereof, and correspondingly reducing the centrifugal loads generated thereby during operation.

The hollow leading edge shell 28 has significant utility when used for effecting aerodynamic forward sweep in the blade 12 for improving aerodynamic operation and efficiency of the fan blades. As indicated above, forward aerodynamic sweep is disclosed in detail in U.S. Pat. No. 5,167,489 and may be provided in the blade 12 from at least the mid-span or pitch section thereof to the radially outer tip 22. Aerodynamic sweep is a conventional parameter represented by the inclination of the blade surface, such as the leading edge 28a defined at the shell 28, in the direction of flow relative to the incoming streamsurface of the air 30. A positive sweep angle is indicative of a blade surface inclined in a downstream direction relative to the incoming stream surface, such as found in a conventional swept-back rotor blade. A blade surface disposed perpendicularly to the incoming stream surface has a sweep angle of 0°. And, a blade having a negative sweep angle includes at least the blade tip portion along the leading edge being inclined in an upstream direction relative to the incoming streamsurface for obtaining forward sweep of the blade.

However, in a conventional fan blade having uniform radial sections in either solid or hollow construction, the provision of forward sweep therein also moves forwardly the center of gravity of the blade to undesirably increase centrifugal steady stress along the leading edge of the blade which substantially reduces the useful life thereof.

In accordance with the present invention, by providing a leading edge extension or shell 28 which is relatively lighter than the main body 18 along radial sections, the individual centers of gravity thereof, as well as the collective center of gravity 38 of the blade 12 are offset axially rearwardly toward the blade trailing edge 26 for reducing the centrifugal steady stress along the blade leading edge which otherwise would occur if the shell 28 were solid and uniform in construction with the main body 18. As shown in FIG. 1, it is desirable to offset the collective center of gravity 38 of the blade 12 rearwardly toward the trailing edge 26 so that it is more closely radially aligned with the center of gravity 20a of the blade root 20. Notwithstanding the forward sweep of the blade 12, it is desirable to lighten the blade leading edge region so that the stacking axis of the blade 12 is more linear and radially aligned outwardly of the root center of gravity 20a to limit or avoid centrifugal steady stress increase at the blade leading edge.

In the exemplary embodiment illustrated in FIGS. 3 and 4, the blade main body 18 may be any suitable metal such as titanium, or any suitable composite using carbon or other fiber reinforcement for example, and which are solid in the preferred embodiment. The shell 28 may take various configurations including a thin walled skin of a suitable metal such as titanium having a thickness in the exemplary range of about 15–25 mils, or a suitable carbon or other fiber reinforced composite having a wall thickness in the exemplary range of about 30–60 mils.

As shown in FIGS. 3 and 4, the shell 28 preferably axially overlaps and hides internally the corresponding outboard portion of the body leading edge 24 along both the first and second airfoil sides 34, 36. For example, the shell aft end 28b includes two spaced apart legs which overlap the body leading edge 24 along a first overlap 34a on the first side 34 and along a second overlap 36a on the second side 36 as shown in more particularity in FIG. 4. A suitable adhesive 40 bonds together the shell 28 to the body leading edge 24 along the respective overlaps 34a, 36a to hide the body leading edge 24 internally inside the hollow shell 28. Any suitable adhesive 40 may be used for fixedly joining the shell 28 to the main body 18, such as, for example, an epoxy adhesive, or BMI adhesive available from the Cytec company of Havre De Grace, Md.

The shell leading edge 28a is preferably spaced axially forwardly of the body leading edge 24 at least in part from the blade tip 22 radially inwardly toward the blade root as required for effecting suitable forward, or negative, aerodynamic sweep along the outboard leading edge of the blade near the blade tip. As shown in FIG. 1, the shell 28 is configured to extend axially forwardly from the inboard, exposed portion of the blade leading edge 24 at the root 20 to effect a suitable amount of forward sweep. Forward sweep is preferably effected at least from the pitch or mid-span section of the blade 12 to the blade tip 22 along the outboard region of the leading edge of the blade 12. In the exemplary embodiment illustrated in FIG. 1, the shell 28 extends radially inwardly from the blade tip 22 to about 25% of the span height from the root 20 and is suitably configured to blend into the main body 18 at the exposed leading edge 24.

This is illustrated in more particularity in FIG. 3 which shows the outboard, hidden portion of the body leading edge 24 extending radially inwardly from the tip 22 from a location axially aft of the inboard, exposed portion of the blade leading edge 24 at the root 20, and then axially forwardly as it approaches the blade root 20. The outboard portion of the body leading edge 24 is hidden inside the shell 28, with the inboard portion of the body leading edge 24 being exposed and being coextensive with the shell leading edge 28a radially below the shell 28 to collectively define the exposed leading edge of the entire blade 12 which first receives the air 30. Accordingly, the blade body 18 comprises the majority of the airfoil geometry, and preferably does not extend significantly axially forwardly of the leading edge root position.

The main body 18 may be conventionally manufactured to provide the required surface features thereof, including a generally conventional aerodynamic profile of the leading edge 24 having a generally smooth crescent point as shown in FIG. 4. The body leading edge 24, although primarily hidden inside the shell 28, is preferably similar in aerodynamic profile to the shell leading edge 28a which also has a suitably smooth crescent point configuration.

Since the shell 28 has a lighter construction, and therefore lower strength than the solid main body 18, it is not capable of withstanding or absorbing the energy associated with high speed impact with relatively large foreign objects such as birds. In this event, the shell 28 is intended to detach from the main body 18 upon impact so that the energy of impact may be absorbed by the main body 18 itself. The detached pieces of the shell 28 are of light construction so that they do not cause significant damage to subsequent rows of rotating components in the engine.

Following such an impact, several adjacent shells 28 of adjacent blades 12 would be similarly damaged. Curl in a conventional fan blade may cause a significant distortion in aerodynamic performance leading to an undesirable aerodynamic excitation force which could reduce stall margin of downstream compressor blades, and substantially increase undesirable rotor vibrations. The exposed leading edge 24 of the blade surface sustains considerably less curl than a conventional fan blade such that the loss of the detachable leading edge shell 28 is less severe than the curl induced on a conventional fan blade.

The detachable shells 28 significantly reduce these problems since the thin wall construction of the shell 28 reduces or eliminates any remaining curl at the blade leading edge, while additionally providing a replacement leading edge in the form of the initially hidden outboard portion of the main body leading edge 24. Upon partial or complete detachment of the shell 28 from the body 18 by foreign object damage, the body leading edge 24 hidden inside the shell 28 is exposed to the air 30, and engages the air 30 for maintaining continued aerodynamic performance of the blade 12, although at non-optimum performance. The shape of the remaining blade body 18 is suitably designed such that it will continue to function as an adequate airfoil, and can continue to run at reduced power output without stalling or causing unacceptable vibration in the engine.

In the preferred embodiment illustrated in FIGS. 3 and 4, the shell 28 is empty and effects forward sweep of the blade 12 along the outer span at the leading edge. The shell 28, therefore, extends or tapers radially inwardly from the blade tip 22 at the shell outer end 28d toward the blade root 20, and tapers to blend the shell leading edge 28a to the exposed body leading edge 24 above the root 20. The shell 28 provides a part span leading edge extension for the blade 12 from its tip to adjacent its root.

The shell 28 is preferably empty for minimizing its weight and maximizing the offset of the collective center of gravity 38 of the blade 12 in the axially aft direction. The blade body 18 may be solid, or may even be hollow with suitable internal ribs or spars for structural integrity. In the preferred embodiment, the effect of the hollow shell 28 in a forward swept blade is to offset toward the blade trailing edge the collective center of gravity as compared to an otherwise conventional, uniformly configured solid or hollow fan blade.

As shown in FIG. 4, the shell 28 extends axially a suitable distance along both sides of the main body 18 to ensure effective amounts of overlaps 34a, 36a for providing suitable strength and attachment thereto by the adhesive 40 for withstanding the aerodynamic and centrifugal forces generated during operation. The shell 28 may blend with the main body 18 in any suitable configuration, including using suitable steps in the body 18 for receiving the two legs of the shell aft end 28b to effect a substantially continuous and smooth aerodynamic contour along both the first and second sides 34, 36.

Figure 5:
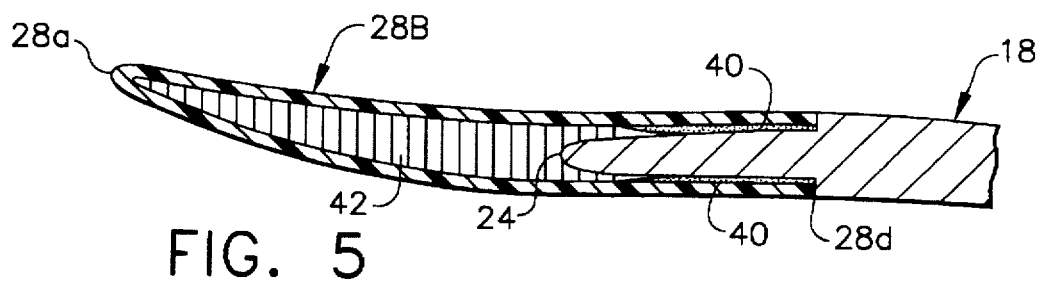
FIG. 5 is a mid-span radial sectional view like FIG. 4 in accordance with an alternate embodiment of the present invention.

Illustrated in FIG. 5 is another embodiment of the leading edge extension or shell, designated 28B which is similar in configuration to the first embodiment illustrated in FIG. 4. In FIG. 5, the shell 28B is formed of a suitable composite, such as carbon reinforced composite, and again is suitably bonded to the main body 18 by the adhesive 40. In this embodiment, additional stiffness is provided to the shell 28B by an internal support in the form of a lightweight core 42 of suitable honeycomb or foam. The honeycomb core 42 illustrated in FIG. 5 has cells extending normally to the shell internal surfaces for providing shear and bending strength and may be suitably adhesively bonded to the inner surface of the shell 28B to provide an integral extension to the main body 18. The structural core 42 preferably completely fills the shell 28B between the shell leading edge 28a and the body leading edge 24. In the exemplary embodiment illustrated in FIG. 5, the body 18 is a suitable metal such as titanium, and the shell 28B is a suitable carbon reinforced composite, or could be metal like titanium if desired.

The FIG. 5 embodiment, like FIG. 4, also provides the advantage of effecting significant forward sweep in the blade 12, while in turn the collective center of gravity of the blade 12 remains axially aft and more closely radially aligned with the center of gravity of the blade root 20. Enhanced aerodynamic operation and efficiency may therefore be obtained from the forward sweep of the shells 28, 28B without a corresponding and undesirable increase in steady stress at the blade root 20 adjacent the leading edge 24. In both embodiments illustrated in FIGS. 4 and 5, the lightweight, adhesively bonded shells 28, 28B are structurally sufficient for accommodating aerodynamic and vibratory loads during normal operation, yet are readily detachable at least in part upon impact from relatively large foreign objects such as birds. The shells will detach without significant curl to the body 18 to expose the aerodynamically sharp body leading edge 24 otherwise hidden within the shells which maintains effective aerodynamic operation of the damaged blades for reduced power operation without stalling or unacceptable vibration.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A gas turbine engine fan blade configured for extending radially outwardly from a perimeter of a rotor disk, comprising:

a main body having a radially spaced apart root and tip, and axially spaced apart leading edge and trailing edge;

a front shell fixedly joined to at least a portion of said body leading edge to collectively define with said body an airfoil having first and second opposite sides extending between said root, tip, shell, and trailing edge for pressurizing air flowing thereover; and said shell being hollow to offset toward said trailing edge a collective center of gravity of said airfoil and increase linearity of a stacking axis of said blade radially outwardly of a center of gravity of said body root.

2. A blade according to claim 1 wherein said shell overlaps and hides said body leading edge along both said first and second airfoil sides.

3. A blade according to claim 2 further comprising an adhesive bonding together said shell to said body leading edge along respective overlaps at said first and second airfoil sides.

4. A blade according to claim 3 wherein said shell includes a leading edge spaced forwardly of said body leading edge at least in part, and said body leading edge is similar in aerodynamic profile to said shell leading edge for engaging said air upon detachment of said shell from said body to expose said body leading edge.

5. A blade according to claim 4 wherein said shell extends radially inwardly from said tip toward said root and tapers to blend said shell leading edge with said body leading edge above said root.

6. A blade according to claim 5 wherein said shell is empty.

7. A blade according to claim 5 further comprising a structural core disposed inside said shell between said shell leading edge and said body leading edge.

8. A blade according to claim 7 wherein said core has a honeycomb configuration.

9. A blade according to claim 5 wherein said body is metal, and said shell is a composite.

10. A blade according to claim 5 wherein said shell is configured to extend axially forwardly from said body leading edge at said root to effect forward aerodynamic sweep.

11. A blade according to claim 1 further comprising a structural core disposed inside said shell between said shell leading edge and said body leading edge.

12. A blade according to claim 11 wherein said core has a honeycomb configuration.

13. A blade according to claim 1 wherein said shell is configured to extend axially forwardly from said leading edge at said root to effect forward aerodynamic sweep.

14. A blade according to claim 1 wherein said shell has a lower strength than said body for being detached therefrom upon impact with a foreign object during operation to expose said body leading edge and absorb impact energy in said body.

* * * * *